Patented June 17, 1952

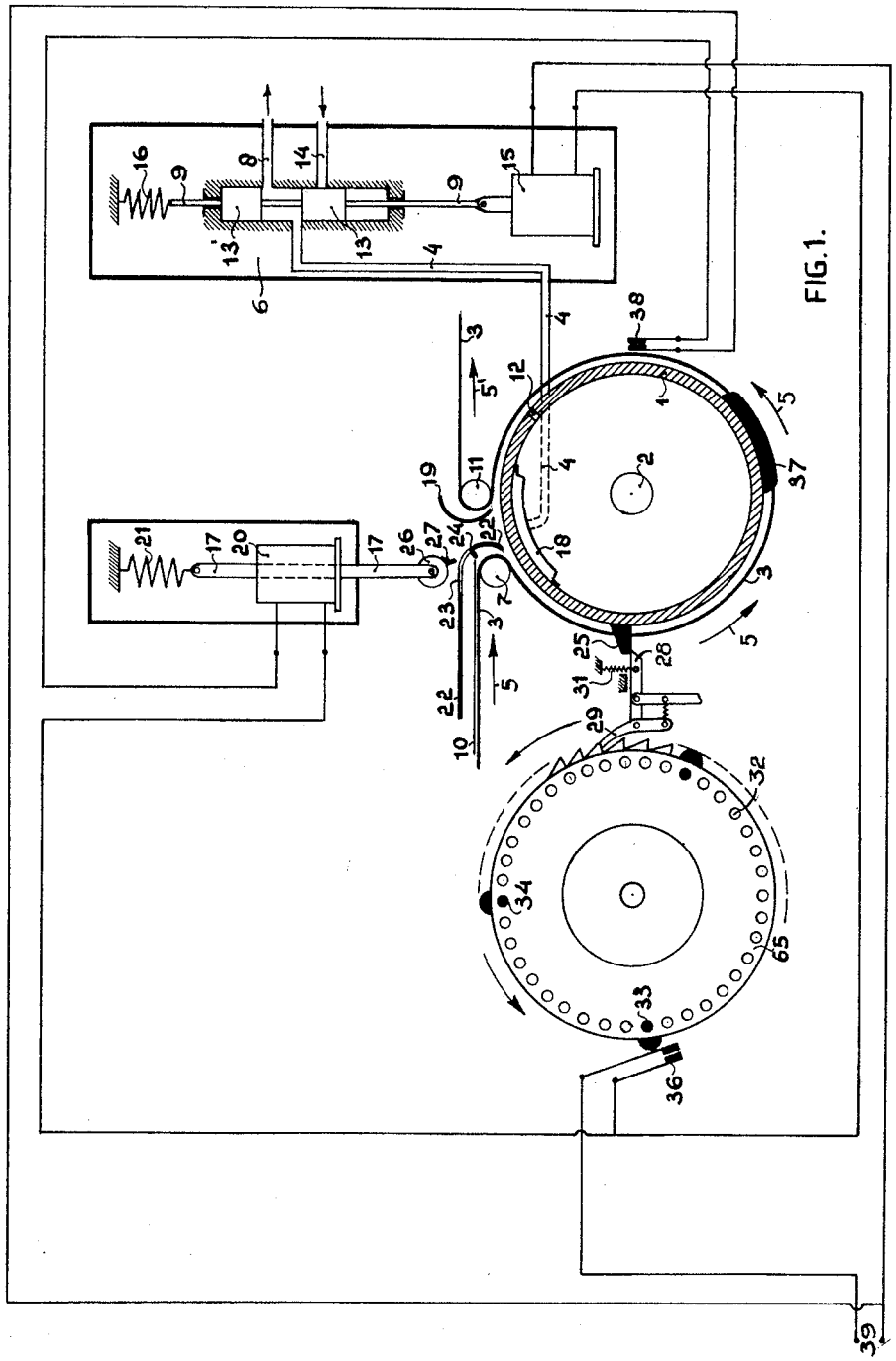

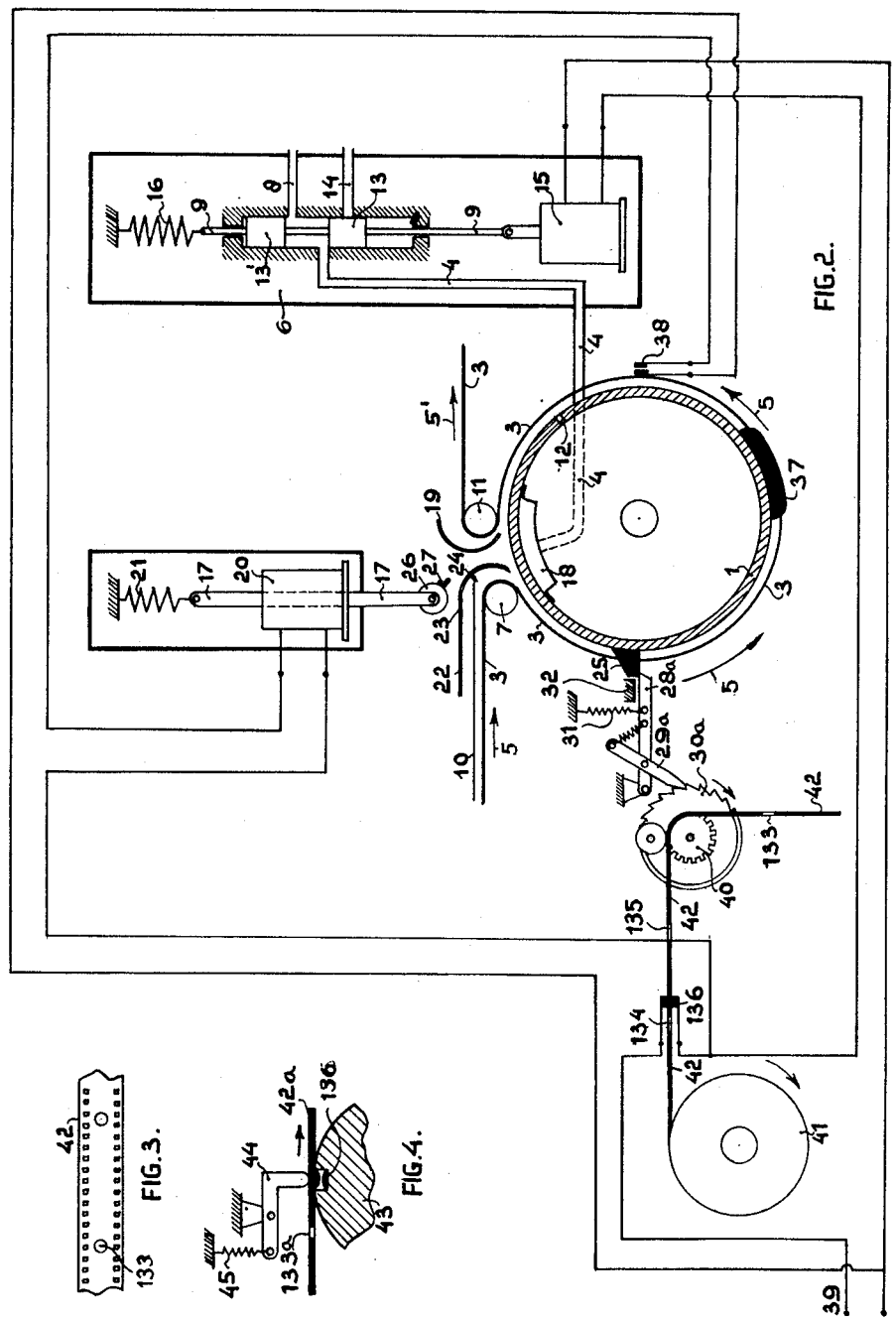

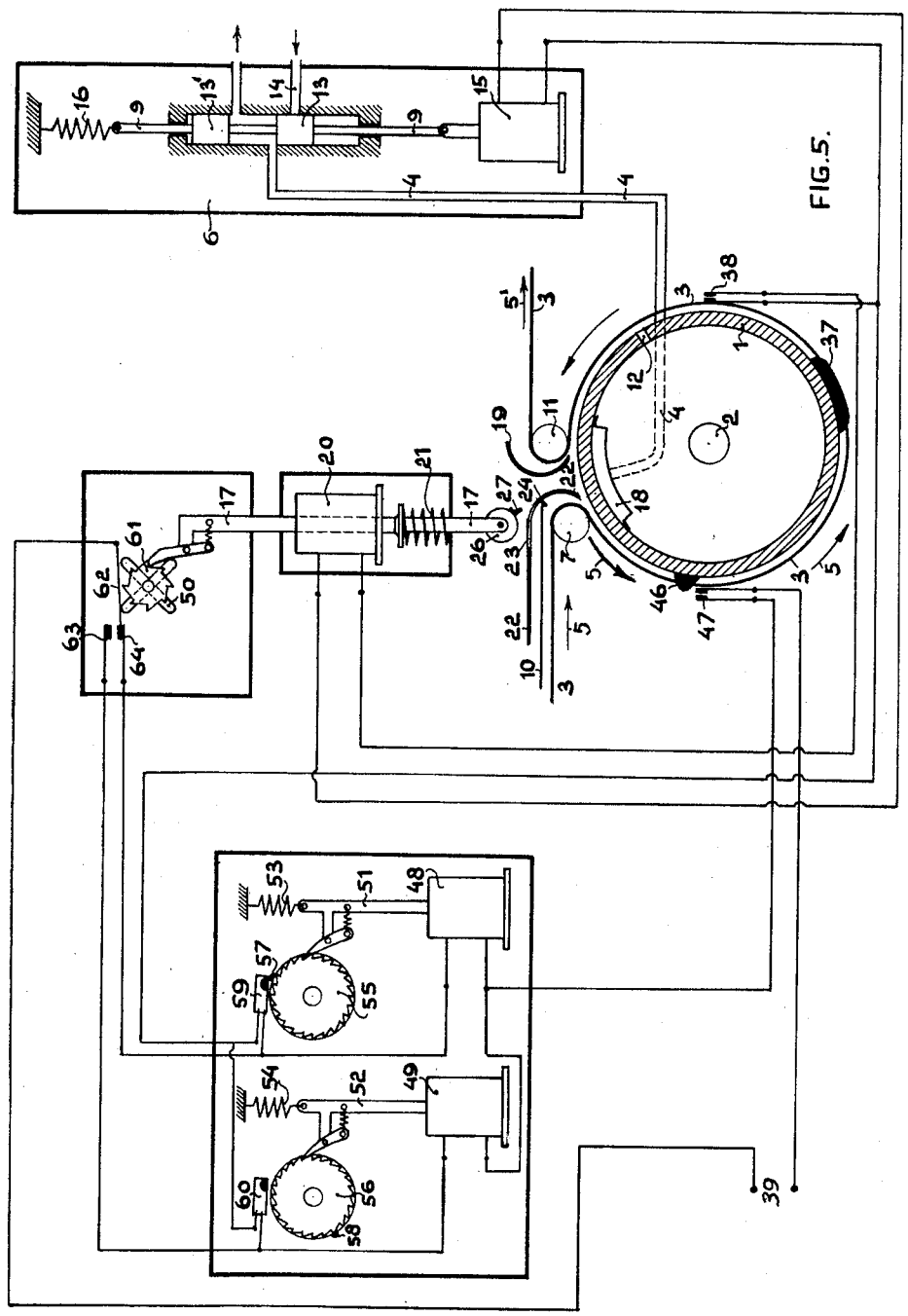

2,600,470

UNITED STATES PATENT OFFICE 2,600,470

AUTOMATIC EXPOSURE APPARATUS FOR MAKING PHOTOGRAPHIC PRINTS

Theo Pierre Chretien Breuers and Theodoor Hillebrand Linthout, Venlo, Netherlands, assignors to Chemische Fabriek L. van der Grinten, a company of the Netherlands Application October 5, 1948, Serial No. 52,922
In the Netherlands October 6, 1947

18 Claims. (Cl. 95—77.5)

The invention relates to exposure apparatus for making photographic contact copies by light transmission through a transparent (light pervious) original, provided with means for automatically replacing or changing an original no longer wanted by another one subsequently to be copied. The new original is automatically moved into and fixed in the working position.

The means used for handling originals in known exposure apparatus are operated manually. They permit making either one copy or a series of copies from one and the same original, and this original is replaced by the next one after the copy or series of copies has been exposed, the new original being brought into working position by manually operated means. Such apparatus requires the operator's continuous attention.

The operator's task would only be slightly facilitated by equipping the machine with a counting device, counting the number of exposure operations or exposure cycles, hereinafter simply called "exposures," because the operator would continuously have to give attention to the counting device in order to be able to operate the original replacement means in due time after the required number of copies had been obtained, and this in order to start making one or more copies from a fresh original.

The object of this invention is to automatize a machine of the kind referred to a considerable extent and thus make it more useful.

According to this invention the changing mechanism for the originals is operated automatically and a counting device is provided for counting the number of exposures and also for issuing a controlling impulse for the changing mechanism; and in addition the element of that device giving the controlling impulse, or a complementary element, is made adjustable. In such apparatus the counting device not only has the passive function of counting the number of exposures but has also the task of automatically limiting the number of copies that is to be made from an original. Moreover, in conjunction with these functions it controls the substitution of a fresh original for the original just copied, whereupon copies also can be made automatically from the fresh original, again in a controllable number.

By means of such machine and with a minimum of attention and labor it becomes possible to make copies from a large number of originals in rapid succession. The number of copies to be made may be chosen quite arbitrarily for each original. The machine can be set simultaneously for making groups of different copies, these groups to be delivered one after the other. In each group the copies will be arranged in order corresponding to the order in which they are produced in the exposure apparatus. Thus it is possible to set out beforehand a definite schedule of copies to be made. In this way the machine can be set, for example, to make quite automatically, say first five copies of one original, then ten copies of another original, including automatic substituting of the second original for the first one, without any intermediate attendance by the operator.

In the drawings several embodiments of the invention have been diagrammatically illustrated.

Fig. 1 is a sectional diagram of a continuously operating exposure apparatus provided with a counting disc.

Fig. 2 is a sectional diagram of an apparatus operated with a perforated strip or tape.

Fig. 3 shows part of the perforated strip used in the apparatus according to Fig. 2.

Fig. 4 is a part sectional view of the perforated strip co-operating with an electrical contact.

Fig. 5 is a sectional view of an exposure apparatus comprising two counting devices which are actuated alternately.

In the apparatus according to Fig. 1 a rotatably mounted glass cylinder 1 surrounds the tubular lamp 2. A web of light-sensitive diazotype paper 3 moves from a roll (not represented) in the direction of the arrows 5, passing over roll 7 and around cylinder 1, and then it is moved away around the roll 11 in the direction of arrow 5'. The light-sensitive side of band 3 is turned towards the cylinder 1. As indicated diagrammatically by arrow 5 the web 3 is carried along with a constant speed in the direction of that arrow and past arrow 5' it continues its way to a developing device (not represented), for example, a diazotype developing machine for semi-wet or ammonia fume development. Further, the web 3 may travel to a cutting and/or drying device and the cut sheets may be stored in a receptacle or, if no cutting is done, it may travel to a winding-up device. The web or band 3 exerts pressure on cylinder 1 which is rotatably mounted, and in its motion it drags this cylinder along with the same speed, i. e. web 3 drives the cylinder 1.

A transparent (light pervious) original 10, for example, a drawing on a sheet of transparent paper of quarto size, of which a number of contact copies has to be made, lies in the manner indicated in the figure on the left-hand or cylinder-approaching part of the moving band 3 and is held in its place by an abutment 24 notwithstanding that band 3 may be moving. Abutment 24 is attached to a curved guiding screen 22 comprising apertures 23, above which is mounted the freely rotatable disc roller 26 comprising broad discs adapted to descend into these apertures 23. A row of fingers or lips 27 is attached to the rollers. They likewise are adapted to enter the apertures 23. As will be described more in detail hereinafter, disc roller 26 and fingers 27 may be moved downward together, the fingers 27 then bending downward the front edge of the original 10 until it comes beyond the reach of the abutment 24 and is pressed into contact with the moving paper band 3 at the top of roller 7. Due to this the original 10 will start to move with the speed of band 3, and the freely rotatable roller 26 will start revolving to displace the fingers and keep them from obstructing movement of the original. Thus the original will be introduced between the cylinder 1 and the band 2, guided in its path by the curved screen 22. While traveling its route around the cylinder 1 it is contact copied on band 3 by means of the light emanating from the light source 2.

The disc roller 26 together with the fingers 27 will descend in synchronism with the rotation of the cylinder 1, and if synchronization is exact the front edge of the original is deposited exactly onto a row of air ducts 12 provided in the wall of the cylinder 1 in parallel with the axis of the latter. Adjacent to the inner surface of the cylinder 1 is a stationary air chamber 18, extending parallel to the axis of the cylinder 1 and over the full length of the latter. This chamber extends laterally over an arc bridging the zone where the band 3 and guide 22 bring the leading margin of an original to the outer surface of the cylinder. By means of tube 4 this air chamber 18 is connected to an air switch mechanism 6, which in the illustrated position connects tube 4 via tube 8 to a vacuum device. Whenever revolution of the cylinder 1 brings the orifices of the air ducts 12 into communication with air chamber 18 and mechanism 6 is in that position air is sucked in through these air ducts. If, as above described, the leading edge of an original has been disposed on the row of air ducts 12, that edge is sucked firmly onto the cylinder 1 for as long as the ducts pass over the width of chamber 18, which assures that the entire original is carried along without changing its position on the cylinder 1. Thus in every revolution of cylinder 1 the original may be copied on band 3. If the air switch 6 is switched over by moving piston rod 9 carrying the pistons 13 and 13' downward, the tube 4 will be connected to tube 14, in communication with an air blowing device. Then the tube 4 will generate pressure in chamber 18, and when the row of ducts 12 passes over this chamber air will be blown out through the ducts 12, resulting in blowing off the leading margin of the original resting on it due to which the original guided by screen 19 is moved out of the exposure apparatus. The removal zone at roller 11 and guide 19 is spaced somewhat from the applying zone at roller 7 and guide 22, and air chamber 18 spans a minor arc of the cylinder rotation which bridges both zones.

By correct mutual synchronization of cylinder rotation, air switch 6 and introduction mechanism 22, 23, 24, 26, 27 replacement of one original by another is effected. It, of course, is assumed that a fresh original 10 is always supplied in due time in front of the abutment 24 and on the band 3. This may be done by hand or by any suitable sheet feeding mechanism. In Fig. 1 the piston rod 9 of the air switch is under the periodical influence of a magnet 15 on one hand and under the continuous pulling force of a spring 16 on the other. When magnet 15 is energized, piston rod 9 will be pulled downward and the air chamber 18 will be subjected to overpressure (blowing), but when magnet 15 is deenergized, spring 16 acting on piston rod 9 will pull the mechanism again into the suction position. The disc roller 26 with the row of fingers 27 is mounted for movement downward and upward by means of a bar 17, which is periodically actuated by a magnet 20 and permanently pulled by a spring 21. When magnet 20 is energized, bar 17 with disc roller 26 and the row of fingers 27 will be moved downward and pressed onto the band 3 above the roller 7. When magnet 20 is deenergized, spring 21 will pull bar 17 with roller 26 and fingers 27 upward again.

One of the outer edges or ends of cylinder 1 is equipped with a projection or stud 25 which in every revolution of the cylinder pushes a pivoted lever 28 downward. This causes a pawl 29 mounted on the lever 28 and engaging a tooth of a ratchet wheel 30 to move upward and thus shift the ratchet wheel 30 and a counter disc 65 connected with it forward (angularly) a certain distance or step. The pawl is pressed yieldably against the ratchet so that it may move backward over a ratchet tooth without moving disc 65 when, after being passed by the projection 25, the lever 28 is returned by the pull of a spring 31 into its original position against abutment 32. This action is repeated in every revolution of the cylinder 1, with the result that the ratchet wheel 30 in every revolution (corresponding to one exposure) is shifted one step or tooth, so the ratchet wheel 30 and the driven disc 65 constitute a counting device. The disc 65 is provided, corresponding to the number of teeth of the ratchet wheel 30, with a number of possible positions, for example, holes 32, for riders. In Fig. 1 three of such riders have been illustrated, indicated by 33, 34 and 35. At 36 a stationary electric contact is mounted so as to be operated by a projection of a rider whenever such rider is positioned at the contact. In the position illustrated the situation is such that rider 33 will soon operate contact 36, i. e. upon a small further rotational movement of the cylinder 1 the stud 25 through lever 28 and pawl 29 will shift the ratchet wheel by one tooth and rider 33 will operate contact 36 to close an electrical circuit through this contact.

Besides the stud 25, the cylinder 1 carries a cam 37. This is arranged in a plane of rotation other than that of stud 25 and consequently does not touch lever 28. The cam 37, however, touches a fixed contact 38 and operates the latter in passing it during part of each cylinder revolution.

At 39 the electric circuit comprising the magnets 15 and 20 and the two stitches 36 and 38 is connected to a source of energizing current. The apparatus illustrated in Fig. 1 is operated as follows:

It is assumed that the leading margin of an original overlies the row of ducts 12 between the cylinder 1 and the band 3 and that the air switch 6, as illustrated, is positioned at "suction." When stud 25 has passed lever 28 and rider 33 has closed contact 36 (which remains closed until stud 25 after one entire revolution passes lever 28 again) the circuit of magnet 15 is closed. Thus the underpressure in chamber 18 is switched over to overpressure and as soon as the row of ducts 12 after further rotation of the cylinder comes into communication with this chamber, the original is blown off the cylinder 1 and is guided away via 19 and thus removed from the cylinder 1. After some further rotation the row of ducts will be above the middle of chamber 18, i. e., at a point between the removal zone and the applying zone, and meanwhile cam 37 approaches contact 38 and operates it. Now both contacts 36 and 38 are closed, magnet 20 is energized while cam 37 operates contact 38, and the fresh original 10—as described before—is automatically brought to the cylinder 1 with its front edge just over the row of ducts 12. Thus a complete replacement or change of originals has been effected.

Now the new original continues its course between band 3 and cylinder 1 and after further rotation of cylinder 1 the apparatus returns to the position illustrated in Fig. 1, i. e. near to the position in which stud 25 again switches ratchet wheel 30 one tooth, whereupon contact 36 is released again. Owing to this the magnet 15 is deenergized and spring 16 pulls piston rod 9 with pistons 13 and 13' back into the illustrated position, i. e. into the suction position. After further rotation the row of air ducts 12 passes over chamber 18 which now again is sucking, and the original moves along with the cylinder 1 and upon further rotation will be copied on band 3, giving one copy per revolution. In each further revolution cam 37 operates contact 38, but as long as contact 36 is open this has no influence on magnet 20; so bar 17 remains in the lifted position.

Rider 34 has been mounted at ten steps distant from rider 33, and consequently only after ten cycles (exposures) the operation of contact 36 and the accompanying replacement of originals will be repeated. Meanwhile, ten prints have then been made of the original. The distance between the riders 34 and 35 corresponds to thirteen exposures, and after ten prints have been made from the preceding original, thirteen prints are now automatically made from the following original.

Meanwhile the ratchet wheel 30 with its rider disc has revolved and a new setting can be given to rider 33, for example, at a distance of five exposures behind rider 35, so that now five prints are made from the subsequent original. The fresh original 10 each time can be put in readiness by hand. Furthermore, successive originals can be placed in position for printing by arranging them in stepwise formation on the first original to be printed. The setting of the riders also can be done by hand.

The functions of the apparatus as described can be summarized as follows:

The ratchet wheel 30 under the control of stud 25 of the cylinder has counted the exposures. The stud of the riders 33, 34 and 35, each at its own time, have operated the contact 36 that serves as a key for the control. They are elements giving control impulse. The contact 36 directly controls magnet 15, which in turn controls the air switch 6 which controls the replacement mechanism, i. e. in its blowing position its function is to remove from the apparatus an original from which the required number of copies has been made. By operating contact 36 the studs 33, 34 and 35 also (but this indirectly by means of contact 38, which is operated by cam 37 of cylinder 1) control magnet 20, which in its turn controls the second part of the replacement mechanism (introduction of the new original). The operation of the apparatus is quite simple and requires very little skill and attention.

Wheel 30 and disc 65 may be provided with a large number of teeth and a correspondingly large number of rider places, and it is possible to set up on the rider disc a program of numbers of copies to be made from originals succeeding each other, and to put the corresponding originals in readiness in stepped formation. This is possible with not too large a number. It is also possible to substitute for the ratchet wheel 30 or the rider disc 65 an endless belt or some other endless device on which pawl 29 or equivalent means can perform a shifting operation. When the number of teeth of the wheel or belt is such that it can be divided by whole numbers, the riders can be set on them in such a way that a certain number will constantly be repeated. It also is possible to repeat a certain count by arranging the disc or belt so that it will be shifted backward after each controlling operation.

In a known manner, the material to be exposed can be pressed against the cylinder by an endless belt and then the light-sensitive material can be supplied and handled in sheets.

Fig. 2 illustrates an exposure apparatus for making contact copies, which is generally similar in operation to the apparatus of Fig. 1, but in which a perforated strip 42 is utilized for counting exposures. An example of such a perforated strip is illustrated in Fig. 3.

In Fig. 2 a ratchet wheel 30a generally operates in the same manner as the ratchet wheel 30 in the apparatus according to Fig. 1, but it rotates in the reverse direction as a result of another arrangement of the ratchet 29a and the lever 28a. The ratchet wheel 30a is equipped with a double-toothed drum 40 as used for film transport in cinematographic apparatus, having a number of teeth equal to that of the ratchet wheel itself. Roll 41 represents the wound up perforated strip 42, in which at the required distances the perforations 133, 134 and 135 and as many more holes as may be desired can have been made. In Fig. 3 such a hole has been indicated at 133. The strip 42 passes between the contact points of contact 136, over drum 40 and downward to a receptacle. When as a result of a tooth-shifting of ratchet wheel 30 a perforation, for example, hole 134, passes between the point of contact 36, this contact will be closed for the course of one revolution of the cylinder 1. Owing to this—just as in the apparatus according to Fig. 1—magnet 15 is energized for the course of that cylinder revolution and contact 38 can now energize magnet 20 at the right moment. For the rest the operation of this apparatus is like that of the apparatus according to Fig. 1. It has, however, the advantage, that an almost unlimited program of numbers of copies can be set out beforehand on the perforated strip, which numbers correspond to the numbers of prints required from the different originals to be copied. Moreover, setting-up of the schedule by perforation can be effected outside the apparatus, consequently while the exposure apparatus by means of a preceding perforated strip is copying from a series of originals according to its schedule. Then the new strip can be ready before the run controlled by the preceding strip has been finished. Thus a high degree of automaticity and savings of work and time are obtained.

When handling exceptionally large copying schedules in apparatus according to Fig. 2 it may be advantageous to substitute for the rather simple original introducing device illustrated in Fig. 2 one of the many sheet feeding devices known in the printing press art, which in principle may be controlled in the same manner as are roller 26 and fingers 27 in the apparatus according to Fig. 2. It is also possible to provide for an extra device to stop the whole apparatus after the copying schedule has been finished, for example, by means of a contact controlled by a special perforation in the perforated strip. Each perforation in the system of Fig. 2 constitutes an element for producing a control impulse.

If used in the manner indicated in Fig. 2 the perforated strip must have good insulating properties. A strip of somewhat stiff material, however, can be used, for example, with a contact arrangement 136 as illustrated in Fig. 4. Here the contact points are kept apart by elastic means and one of them is arranged in a recess in a block 43 of insulating material, over which the strip 42a upon every exposure is shifted one step in the direction of the arrow. The lever 44 is pressed on the strip 42a by a spring 45. If the perforation 133a comes above contact 136 the lever 44 will touch the contact 136 through this recess. Of course it is also possible to make use of an endless perforated strip, repeating a certain copying schedule. In this way an equal number of copies can be made from a series of originals in an extremely simple manner, and the number of copies or the number of originals in the series may be very large.

The other parts of the apparatus according to Fig. 2 correspond (also as to their reference numerals and to the electric diagram) wholly to the apparatus according to Fig. 1.

The exposure apparatus shown in Fig. 5 operates in the same manner as that in Figs. 1 and 2. In the apparatus according to Fig. 5, however, a cam 46 which momentarily closes contact 47 in passing the latter has been substituted for the stud 25. One of the two magnets 48 and 49 (whichever one of them has been inserted into the electric circuit by a commutator 50) is then energized then either the bar 51 or the bar 52 (both provided with pawls) is pulled downward, released again after a moment and pulled upward by spring 53 or spring 54, so as to shift ahead by one step or tooth the corresponding ratchet wheel 55 or 56. These ratchet wheels carry projections 57 and 58, respectively, each of which in a certain fixed position is able to operate a mercury switch 59 or 60. If one of these switches is operated, it will take a circuit-closing position immediately after the projection 46 has passed contact 47, and switch 59 or 60 then remains closed for a whole revolution of cylinder 1. Owing to this procedure the air switch 6, according to the relevant wiring diagram, is switched to blowing. Thereafter cam 37 operates and afterward releases contact 38, resulting in the magnet 20 being energized and deenergized thereafter, and in this way bar 17 is moved downward and then upward again under the pressure of spring 21. In the manner as described in Figs. 1 and 2 this process brings about a change of originals. However, the bar 17 extends into the commutator 50, and by the described movement it also shifts the eight-toothed ratchet wheel 61 one tooth with the result that the tongue 62 is lifted, breaking its contact with contact point 64 and putting it into contact with contact point 63. Due to this, magnet 48 and mercury switch 59 are cut from the circuit and the latter now includes magnet 49 and mercury switch 60. At the next stroke of ratchet wheel 61 the process is reversed. This reversion consequently takes place at every change or replacement of an original, while either the ratchet wheel 55 or the ratchet wheel 56 (depending upon which of the two has been switched in) is shifted one tooth at every exposure. If now, while ratchet wheel 56 is following step-by-step the number of exposures of a certain original, ratchet wheel 55 is positioned so as to have the projection 57 lying six pitches or steps in advance of the point where this projection 57 will act on the mercury switch 59, and if one waits thereafter until the projection 58 touches the mercury switch 60, then the replacement or change of the original will be executed in the manner as described with reference to Figs. 1 and 2, and immediately after the introduction of the fresh original, commutator 50 will be shifted. After this shift ratchet wheel 55 is the working one, and after having moved through the positioned six steps it will effect a change of original together with a shift of the commutator 50. Meanwhile ratchet wheel 56 again is positioned to indicate a number of copies that is to be made from the following original, and after the original change this ratchet wheel will operate again and while it is operating another number of copies can be set on ratchet wheel 55 for the following original, etc. For the rest the mechanism operates in the same manner as described with reference to Figs. 1 and 2. It will be understood that the ratchet wheels 55 and 56 act in combination with the cylinder as counting devices.

It is possible of course to provide and use more than two counting devices if only the commutator 50 is modified accordingly. Then a longer copying schedule can be predetermined beforehand. When two or more counting devices are provided, a certain number of prints can be constantly repeated in a manner analogous to that which is possible with the use of one counting device as in Fig. 1.

It stands to reason that the apparatus according to this invention, to the extent consistent with the requirements of the claims, can be equipped with more than one counting wheel, counting belt or perforated strip, or with more than one row of riders, or with perforated strips having more than one row of holes, with more than one contact, etc., and even with various means that are used in counting techniques (dividing apparatus, calculating machines, etc.).

The invention, except as required by the appended claims, is not restricted to the embodiments illustrated in the drawings, using partly electrical control; apparatus controlled by other means (for example, pneumatic), or apparatus with purely mechanical control, also lie within the field of the invention. Electric apparatus can be equipped with suitable relays by means of which it is possible to operate the contacts with low voltage current.

Nor is the invention, except as required by the appended claims, limited to exposing apparatus equipped with pneumatic change of original; it can also be successfully applied to other apparatus, for example, apparatus in which exposing is effected on a flat plane. For such apparatus, however, the control is less simple. It is obvious that in apparatus according to the invention other operations than change of original also can be effected synchronously with the cylinder revolution, for example, cutting and/or folding operations.

This application is a continuation-in-part of our copending application, Serial No. 47,004, filed August 31, 1948, which discloses and claims new structures and combinations used according to the illustrated embodiments of this invention for delivering originals to the rotating exposure cylinder, for holding each original to the cylinder as it moves through the exposing path, and for either ejecting the exposed original or carrying it onward on the cylinder for a repeated exposure as it moves in a short return path between the removal zone and the applying zone.

What we claim is:

1. An exposure apparatus for contact photoprinting, comprising a light pervious exposure member having a surface to receive sheet material for printing, said member being mounted for cyclic movement through an exposing path about a light source to expose through said member material held on said surface and then through a return path to resume exposing movement, normally inactive means adjacent said member for delivering an original sheet to said surface in said return path, and control means including a counting device, means operated in each exposing movement of said member to move said counting device, and means controlled by said counting device to activate said sheet delivering means after a predetermined number of such movements.

2. An exposure apparatus for contact photoprinting, comprising a light pervious exposure member having a surface to receive sheet material for printing, said member being mounted for cyclic movement through an exposing path about a light source to expose through said member material on said surface and then through a return path to resume exposing movement, means normally operative to hold an original sheet to said surface during movements thereof through both paths, normally inactive means operable to release and eject the held sheet for removal from said surface at a point in said return path, and control means, including a counting device, means actuated in each exposing movement of said member to move said counting device and elements actuated by said counting device, to activate said releasing and ejecting means after a predetermined number of such movements.

3. An exposure apparatus for contact photoprinting, comprising a light pervious exposure member having a surface to receive sheet material for printing, said member being mounted for cyclic movement through an exposing path about a light source to expose through said member material on said surface and then through a return path to resume exposing movement, normally inactive means for delivering an original sheet to said surface at a point in said return path, means normally operative to hold a delivered sheet to said surface during movements thereof through both paths, normally inactive means operable to release and eject the held sheet for removal from said surface at another point in said return path, and control means, including a counting device, means actuated in each exposing movement of said member to move said counting device and elements by said counting device, to activate said releasing and ejecting means and said sheet delivering means in coordination after a predetermined number of exposing movements.

4. An exposure apparatus for contact photoprinting, comprising a light pervious exposure member having a surface to receive sheet material for printing, said member being mounted for cyclic movement through an exposing path about a light source to expose through said member material on said surface and then through a return path to resume exposing movement, means for holding an original sheet to said surface during movements thereof through both paths, including means normally acting at a part of said surface during movement of such part in said return path to grip the leading margin of a sheet thereto, normally inactive means operable to release and eject the gripped margin from said surface in said return path, a progressive control device, means to advance said device a certain step upon each exposing movement of said member, and means including an element actuated by said control device after a predetermined advancement thereof to activate said releasing and ejecting means after a predetermined number of exposing movements.

5. An exposure apparatus for contact photoprinting, comprising a light pervious exposure member having a surface to receive sheet material for printing, said member being mounted for cyclic movement through an exposing path about a light source to expose through said member material on said surface and then through a return path to resume exposing movement, normally inactive means for delivering the leading margin of a sheet to said surface at a point in said return path, means for holding a delivered sheet to said surface during movements thereof through both paths, including means normally acting at a part of said surface during movement of said part in said return path to grip such leading margin thereto, normally inactive means operable to release and eject the gripped margin from said surface at another point in said return path, a progressive control device, means operative to advance said device a certain step upon each exposing movement of said member, and means including elements actuated by said control device after a predetermined advancement thereof to activate said releasing and ejecting means and said sheet delivering means in coordination after a predetermined number of such movements.

6. An exposure apparatus for contact photoprinting, comprising a light pervious exposure cylinder rotatable through an exposing path about a light source to expose sheet material held on its outer surface and then through a return path to resume exposing movement, air duct means in the body of said cylinder opening along a generating line thereof at a limited part of said surface, an air passage communicating with said duct means at least while said part turns in said return path, means connectable with said passage for applying suction therethrough to grip the leading margin of a sheet to said part, means connectable with said passage for applying compressed air therethrough to discharge such margin from said part, control means operable to connect either said suction applying means or said compressed air applying means with said passage, and automatic means responsive to exposing movements of said cylinder for operating said control means.

7. An exposure apparatus for contact photoprinting, comprising a light pervious exposure cylinder rotatable through an exposing path about a light source to expose sheet material held on its outer surface and then through a return path to resume exposing movement, normally inactive means for delivering the leading margin of a sheet to said surface at a point in said return path, air duct means in the body of said cylinder opening along a generating line thereof at a limited part of said surface, an air passage communicating with said duct means at least while said part turns in said return path, means normally connected with said passage for applying suction therethrough to hold such leading margin to said part, means connectable with said passage for applying compressed air therethrough to discharge such margin from said part, control means operable to disconnect said suction applying means and connect said compressed air applying means with said passage, and automatic means responsive to exposing movements of said cylinder for operating said control means and activating said delivery means in coordination.

8. An exposure apparatus for contact photoprinting, comprising a light pervious exposure cylinder rotatable about a light source to expose sheet material held on its outer surface, normally inactive means for delivering a sheet to said surface, means normally operative to hold a delivered sheet thereto during any desired number of cylinder rotations, normally inactive means for discharging the sheet from the rotating cylinder, a counting device, means to advance said counting device a certain step upon each rotation of the cylinder, and control means, including elements actuated by said counting device, to activate said discharging means and said delivering means in coordination after a predetermined number of cylinder rotations.

9. An apparatus as described in claim 8, said counting device comprising a plurality of actuating elements arranged to act successively on said control elements, each acting after a predetermined number of cylinder rotations, so as to produce automatically a desired number of exposures of each of a plurality of sheets delivered successively to said surface.

10. An apparatus as described in claim 8, said counting device comprising an endless movable member having a multiplicity of index points at spacings corresponding to said step and formed to carry removably at any of said points an element to actuate said control elements.

11. An apparatus as described in claim 8, said counting device comprising an elongated strip carrying at predetermined intervals elements operative successively to actuate said control elements.

12. An apparatus as described in claim 8, said counting device comprising a plurality of alternately operative counters, each including a movable member carrying an element to actuate said control elements at any desired distance from the latter, and means responsive to each operation of said sheet delivering means for rendering one of said counters inoperative and rendering another operative.

13. An exposure apparatus for contact photoprinting, comprising a light pervious exposure cylinder having a surface to receive sheet material for printing, means for holding an original sheet to said surface for exposure, the cylinder being rotatable about a light source through an exposing path to expose an original held to said surface and then through a return path to resume exposing movement, normally inactive sheet discharging means including elements on said cylinder operable in said return path to eject from said surface the leading edge of an original held thereon, means responsive to the successive rotations of said cylinder to count the exposures of the original, and means including elements actuated by said counting means after a predetermined number of such exposures to activate said discharging means.

14. An exposure apparatus for contact photoprinting, comprising a light pervious exposure cylinder having a surface to receive sheet material for printing, the cylinder being rotatable about a light source through an exposing path to expose an original sheet held to said surface and then through a return path to resume exposing movement, sheet holding and discharging means having elements in common on the cylinder to control the leading edge of an original thereon and operable as such elements move in said return path either to hold such leading edge to said surface or to eject the same therefrom, means normally retaining the said means in holding position, means responsive to the successive rotations of said cylinder to count the exposures of the original and means including elements actuated by said counting means after a predetermined number of such exposures to shift the said holding and discharging means to ejecting position.

15. An exposure apparatus for contact photoprinting, comprising a light pervious exposure cylinder having a surface to receive sheet material for printing, the cylinder being rotatable about a light source through an exposing path to expose an original sheet held to said surface and then through a return path to resume exposing movement, normally inactive means for delivering an original to said surface at a point in said return path, means responsive to the successive rotations of said cylinder to count the exposures of an original held thereon, and means including elements actuated by said counting means after a predetermined number of such exposures to activate said sheet delivering means.

16. An exposure apparatus for contact photoprinting comprising a light pervious exposure cylinder mounted for rotation through an exposing path about a light source to expose sheet material held on its outer surface and then through a return path to resume exposing movement, air duct means in the body of said cylinder opening along a generating line thereof at a limited part of said surface, an air passage communicating with said duct means at least while said part turns in said return path, air control means having alternate positions for applying through said passage either suction to hold the leading margin of a sheet to said part or compressed air to blow such margin from said part, said air control means being normally in holding position, means for shifting the same to blowing position, an exposure counting device moved upon each exposing movement of said cylinder, and control means rendered operative at predetermined positions of said counting device to actuate said shifting means.

17. An exposure apparatus for contact photoprinting comprising a light pervious exposure cylinder mounted for rotation through an exposing path about a light source to expose sheet material held on its outer surface and then through a return path to resume exposing movement, air duct means in the body of said cylinder opening along a generating line thereof at a limited part of said surface, an air passage communicating with said duct means at least while said part turns in said return path, air control means having alternate positions for applying through said passage either suction to hold the leading margin of a sheet to said part or compressed air to blow such margin from said part, said air control means being normally in holding position, motor means for shifting the same to blowing position, an exposure counting device moved upon each exposing movement of said cylinder, and control means including a switch device actuated by said counting device at predetermined positions of the latter for energizing said motor means.

18. An exposure apparatus for contact photoprinting comprising a light pervious exposure cylinder mounted for rotation through an exposing path about a light source to expose sheet material held on its outer surface and then through a return path to resume exposing movement, air duct means in the body of said cylinder opening along a generating line thereof at a limited part of said surface, an air passage communicating with said duct means at least while said part turns in said return path, a normally inactive sheet delivering means inoperable to advance the leading margin of a sheet to said surface in said return path, air control means having alternate positions for applying through said passage either suction to hold the leading margin of a sheet to said part or compressed air to blow such margin from said part, said air control means being normally in holding position, motor means for shifting the same to blowing position, an exposure counting device moved upon each exposing movement of said cylinder, and control means including a switch device actuated by said counting device at predetermined positions of the latter for energizing said motor means, a second switch device actuated upon each exposing movement of said cylinder, and means for operating said sheet delivering means in response to the actuation of both said switch devices.

THEO PIERRE CHRETIEN BREUERS.
THEODOOR HILLEBRAND LINTHOUT.

REFERENCES CITED

The following references are of record in the file of this patent:

UNITED STATES PATENTS

| Number | Name | Date |
|---|---|---|
| 1,591,118 | Friess | July 6, 1926 |
| 1,732,049 | Hunter | Oct. 15, 1929 |
| 1,924,758 | Sullivan | Aug. 29, 1933 |
| 2,202,496 | La Bombard | May 28, 1940 |
| 2,220,526 | Kluitmann | Nov. 5, 1940 |
| 2,371,925 | Schade et al. | Mar. 20, 1945 |
| 2,431,520 | Streich | Nov. 25, 1947 |
| 2,441,912 | Streich | May 18, 1948 |
| 2,478,384 | Fritts | Aug. 9, 1949 |

FOREIGN PATENTS

| Number | Country | Date |
|---|---|---|
| 315,572 | Germany | Nov. 7, 1919 |